US010823056B2

(12) United States Patent
Suciu et al.

(10) Patent No.: US 10,823,056 B2
(45) Date of Patent: Nov. 3, 2020

(54) BOUNDARY LAYER EXCITATION AFT FAN GAS TURBINE ENGINE

(71) Applicant: United Technologies Corporation, Farmington, CT (US)

(72) Inventors: Gabriel L. Suciu, Glastonbury, CT (US); Jesse M. Chandler, South Windsor, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 784 days.

(21) Appl. No.: 15/371,589

(22) Filed: Dec. 7, 2016

(65) Prior Publication Data

US 2018/0156109 A1    Jun. 7, 2018

(51) Int. Cl.
| | | |
|---|---|---|
| *F02C 6/08* | (2006.01) | |
| *F02K 3/06* | (2006.01) | |
| *F02C 7/36* | (2006.01) | |
| *F02C 3/20* | (2006.01) | |
| *B64D 33/02* | (2006.01) | |
| *F02C 3/10* | (2006.01) | |
| *B64D 27/20* | (2006.01) | |
| *F02K 3/062* | (2006.01) | |
| *B64C 1/16* | (2006.01) | |
| *B64C 21/00* | (2006.01) | |

(52) U.S. Cl.
CPC ............... *F02C 6/08* (2013.01); *B64C 1/16* (2013.01); *B64C 21/00* (2013.01); *B64D 27/20* (2013.01); *B64D 33/02* (2013.01); *F02C 3/10* (2013.01); *F02C 3/20* (2013.01); *F02C 7/36* (2013.01); *F02K 3/06* (2013.01); *F02K 3/062* (2013.01); *B64C 2230/04* (2013.01); *B64D 2033/0226* (2013.01); *F05D 2220/323* (2013.01); *F05D 2220/50* (2013.01); *F05D 2220/76* (2013.01)

(58) Field of Classification Search
CPC ...... F02C 3/10; F02C 3/20; F02C 6/08; F02C 7/36; F02K 3/06; F02K 3/062; B64C 1/16; B64C 21/00; B64D 27/20; B64D 33/02
USPC .......................................................... 244/55
See application file for complete search history.

(56) References Cited

U.S. PATENT DOCUMENTS

| | | |
|---|---|---|
| 3,332,242 A | 7/1967 | Johnson |
| 3,348,379 A | 10/1967 | Wilde et al. |

(Continued)

FOREIGN PATENT DOCUMENTS

| | | |
|---|---|---|
| EP | 2204567 | 7/2010 |
| EP | 3279459 | 2/2018 |

(Continued)

OTHER PUBLICATIONS

European Search Report for Application No. 17206030.3 dated Apr. 19, 2018.

*Primary Examiner* — Richard R. Green
*Assistant Examiner* — Brady W Frazier
(74) *Attorney, Agent, or Firm* — Carlson, Gaskey & Olds, P.C.

(57) ABSTRACT

A boundary layer ingestion engine includes a gas generator and a turbine fluidly connected to the gas generator. A fan is mechanically linked to the turbine via a shaft such that rotation of the turbine is translated to the fan. A boundary layer ingestion inlet is aligned with an expected boundary layer, such that the boundary layer ingestion inlet is configured to ingest fluid from a boundary layer during operation of the boundary layer ingestion engine.

10 Claims, 4 Drawing Sheets

(56) References Cited

U.S. PATENT DOCUMENTS

| | | | |
|---|---|---|---|
| 5,161,369 A | 11/1992 | Williams | |
| 7,631,484 B2 | 12/2009 | Giffin et al. | |
| 7,887,287 B2 | 2/2011 | Yanagi et al. | |
| 8,516,789 B2 | 8/2013 | Kupratis | |
| 8,701,385 B2 | 4/2014 | Clemen | |
| 9,016,041 B2 | 4/2015 | Baughman et al. | |
| 9,297,270 B2 | 3/2016 | Suciu et al. | |
| 10,392,120 B2* | 8/2019 | Niergarth | B64D 27/02 |
| 2008/0098719 A1* | 5/2008 | Addis | B64D 27/10 |
| | | | 60/226.1 |
| 2010/0186418 A1 | 6/2010 | Beutin et al. | |
| 2015/0291285 A1* | 10/2015 | Gallet | F01D 13/02 |
| | | | 415/60 |
| 2017/0037779 A1* | 2/2017 | Khalid | B64C 21/06 |
| 2017/0081034 A1* | 3/2017 | Marrinan | B64C 21/06 |
| 2018/0118368 A1* | 5/2018 | Sands | B64D 27/18 |
| 2018/0208322 A1* | 7/2018 | Tantot | B64D 27/14 |

FOREIGN PATENT DOCUMENTS

| | | | | |
|---|---|---|---|---|
| FR | 1443200 | 6/1966 | | |
| GB | 1211081 | 11/1970 | | |
| GB | 1211081 A | * 11/1970 | | B64C 11/001 |

* cited by examiner

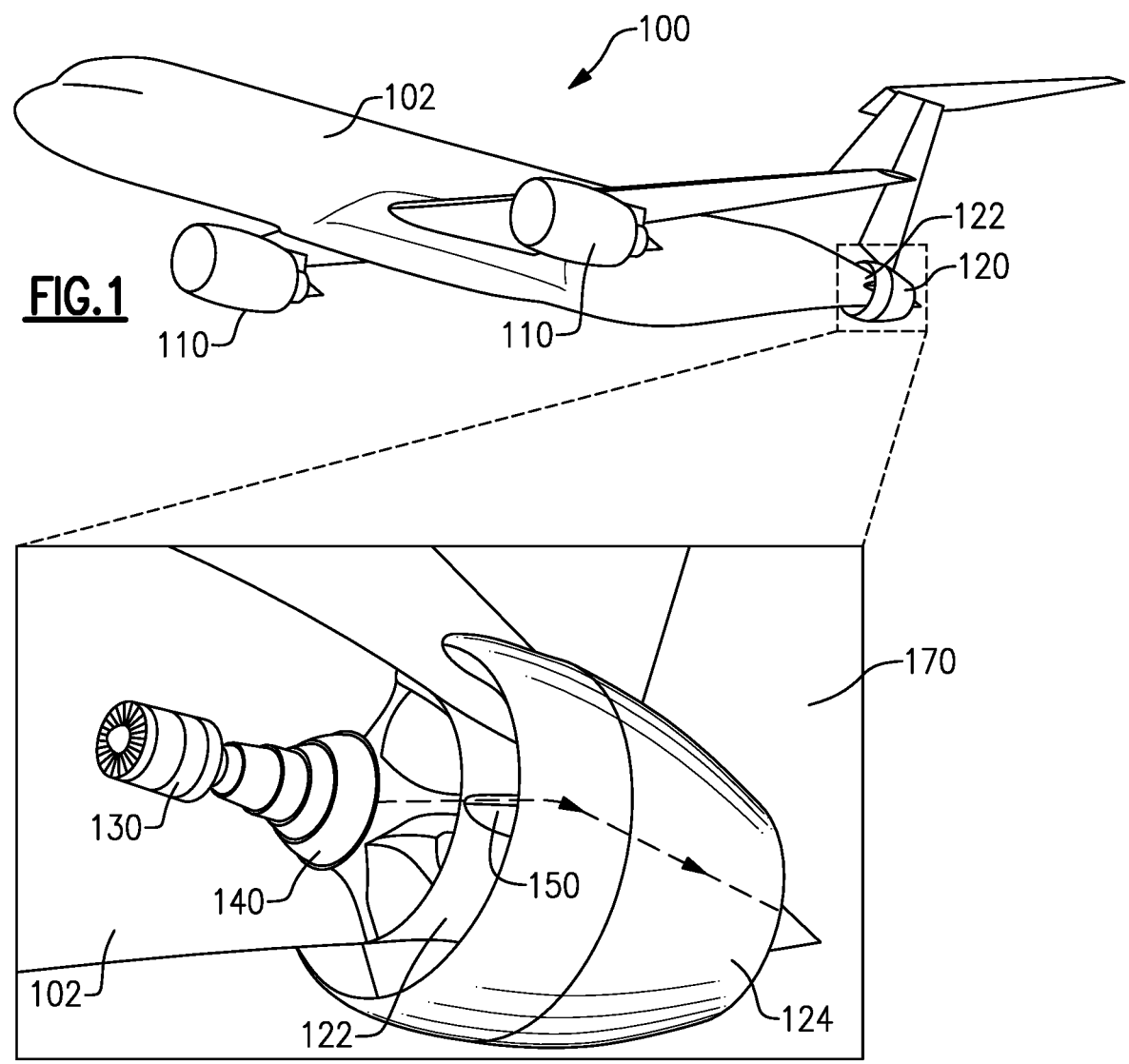

BOUNDARY LAYER EXCITATION AFT FAN GAS TURBINE ENGINE

TECHNICAL FIELD

The present disclosure relates generally to aft fan gas turbine engines, and more specifically to an aft fan gas turbine engine configured to energize a boundary layer of a corresponding vehicle.

BACKGROUND

Aircraft, such as those utilized by commercial airlines, typically include two or more gas turbine engines mounted in or under the wings of the aircraft. The engines generate thrust, propelling the aircraft forward and allowing operation of the aircraft. A typical engine utilized in this configuration includes a fan forward of a turbine engine core, with the turbine engine core driving the rotation of the fan either via a direct drive system or a geared connection.

During flight, air passing over the fuselage of the aircraft forms a boundary layer immediately adjacent the fuselage due to friction between the air and the fuselage. The boundary layer resists forward motion through the air. In order to overcome the resistance of the boundary layer, the engines are typically oversized relative to a thrust requirement of the aircraft were the boundary layer to not be present.

SUMMARY OF THE INVENTION

In one exemplary embodiment a boundary layer ingestion engine includes a gas generator, a turbine fluidly connected to the gas generator, a fan mechanically linked to the turbine via a shaft such that rotation of the turbine is translated to the fan, and a boundary layer ingestion inlet aligned with an expected boundary layer, such that the boundary layer ingestion inlet is configured to ingest fluid from a boundary layer during operation of the boundary layer ingestion engine.

In another example of the above described boundary layer ingestion engine the fan is positioned aft of the turbine.

In another example of any of the above described boundary layer ingestion engines the boundary layer ingestion inlet is an inlet of a fan duct.

Another example of any of the above described boundary layer ingestion engines further includes at least one turbine exhaust duct connected to an exhaust outlet of the turbine, at least a portion of the at least one turbine exhaust duct passing radially outwards of the fan duct.

In another example of any of the above described boundary layer ingestion engines the at least one turbine exhaust ducts passes through the fan duct interior and through at least one strut.

In another example of any of the above described boundary layer ingestion engines the fan duct and the at least one turbine exhaust duct merge aft of the fan and fore of a flowpath outlet of the boundary layer ingestion engine.

Another example of any of the above described boundary layer ingestion engines further includes an electric generator mechanically connected to the fan such that rotation of the fan drives rotation of the electric generator.

In another example of any of the above described boundary layer ingestion engines the electric generator is mechanically connected to the fan through a clutch, and the generator is configured to rotate at a different rotational speed than the fan.

In another example of any of the above described boundary layer ingestion engines the boundary layer ingestion engine is an auxiliary power unit.

In another example of any of the above described boundary layer ingestion engines the boundary layer ingestion engine is a tail mounted engine for an aircraft, and wherein the aircraft includes at least two wing mounted engines.

In another example of any of the above described boundary layer ingestion engines the tail mounted engine is sized to provide approximately 15% of a thrust requirement during all modes of engine operation, and the at least two wing mounted engines are sized to provide a combined 85% of the thrust requirement during all modes of engine operation.

In another example of any of the above described boundary layer ingestion engines the gas generator is angled relative to an axis defined by the turbine.

In another example of any of the above described boundary layer ingestion engines the angle of gas generator defines a burst zone and wherein the burst zone is characterized by a lack of intersection with essential aircraft components.

In another example of any of the above described boundary layer ingestion engines an inner wall of the boundary layer ingestion inlet is an aircraft tail connection flange.

An exemplary method for energizing a boundary layer of a vehicle includes ingesting a portion of the boundary layer at a fan inlet of a turbine engine, thereby driving the boundary layer to move relative to an aircraft fuselage.

In another example of the above described method for energizing a boundary layer of a vehicle ingesting a portion of the boundary layer, includes ingesting a boundary layer at a tail section of the vehicle.

In another example of any of the above described methods for energizing a boundary layer of a vehicle the turbine engine is an aft fan turbine engine, and ingesting a portion of the boundary layer at the turbine engine inlet is achieved by driving rotation of a fan using a turbine motor, the fan being positioned aft of the turbine motor.

Another example of any of the above described methods for energizing a boundary layer of a vehicle further includes operating the turbine engine as an Auxiliary Power Unit in at least one mode of vehicle operations.

Another example of any of the above described methods for energizing a boundary layer of a vehicle further includes preventing windmilling of a fan of the turbine engine via natural resistance of an electric generator connected to the fan.

Another example of any of the above described methods for energizing a boundary layer of a vehicle further includes preventing windmilling of a fan of the turbine engine via driving rotation of an electric generator connected to the fan in a direction opposite the direction of windmilling.

These and other features of the present invention can be best understood from the following specification and drawings, the following of which is a brief description.

BRIEF DESCRIPTION OF THE DRAWINGS

FIG. 1 illustrates an exemplary aircraft including an aft fan gas turbine engine for boundary layer excitation.

FIG. 2 schematically illustrates a zoomed, partially transparent, view of a tail section of the exemplary aircraft of FIG. 1.

DETAILED DESCRIPTION OF AN EMBODIMENT

Figure 3:
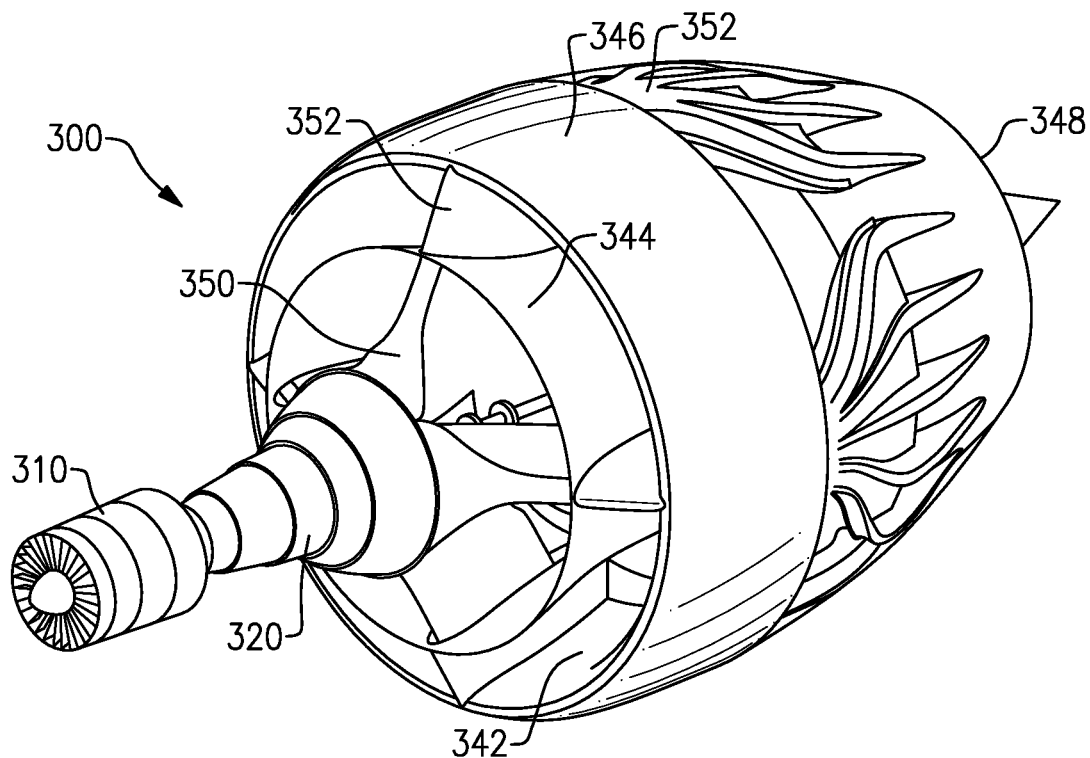
FIG. 3 schematically illustrates an exemplary aft fan gas turbine engine.

FIG. 1 schematically illustrates an exemplary aircraft 100 including two conventional, wing mounted gas turbine engines 110, and a tail mounted aft fan turbine engine 120. During flight operations, such as during a cruise mode of operations, a boundary layer forms along the surface of the fuselage 102. The boundary layer creates drag and resists forward motion of the aircraft 100. Conventional aircrafts size the engines 110 to overcome the boundary layer drag during operation of the aircraft. This oversizing of the engine 110 can result in decreases in the efficiency of the engine operation.

In the example of FIG. 1, the tail mounted engine 120 is an aft fan engine, and includes a fan aft of a free-turbine. An engine inlet 122 causes boundary layer air to enter a fan duct of the engine 120. The rotation of the aft fan is driven by the free-turbine and ingests the boundary layer, thereby actively energizing the boundary layer. Energizing the boundary layer refers to causing the boundary layer to move, relative to the fuselage, and reduces or eliminates the drag resistance generated by the boundary layer. As a result of the energization of the boundary layer, the wing mounted engines 110 can be sized smaller, operate at an increased efficiency, or both.

In some examples, the aft fan engine 120 can generate up to 15% of the required thrust power, as well as energizing the boundary layer. In such an example, the wing mounted engines 110 can be downsized to a corresponding 85% of the size that would be required absent the aft fan engine 120. In alternative examples, the aft fan engine 120 can be sized to only provide sufficient airflow to energize the boundary layer, and the corresponding wing mounted engines 110 can be operated at increased efficiency while still maintaining the same size as a standard configuration.

In yet further examples, the gas generator, which drives the aft fan engine 120, can be configured to operate as an Auxiliary Power Unit (APU) for the aircraft 100.

With continued reference to FIG. 1, and with like numerals indicating like elements, FIG. 2 schematically illustrates a zoomed in view of the aft fan engine 120 of FIG. 1. The aft fan engine 120 includes the above described fan inlet 122 configured to ingest a boundary layer, and is encompassed by an aerodynamic fairing 124. A gas generator 130 is positioned fore of the fan inlet 122, within the fuselage 102 of the aircraft 100. Compressed gas from the gas generator 130 drives rotation of a free-turbine 140, which in turn drives rotation of the fan (hidden) aft of the turbine 140. A turbine exhaust is ducted through one or more struts 150 in the inlet, and passed to an exhaust port aft of the fan. The exhaust duct runs through the fairing 124, radially outward of the fan duct. The gas generator 130 can be any known gas generator type, and is not required to be in line with the turbine motor 140.

Figure 4:
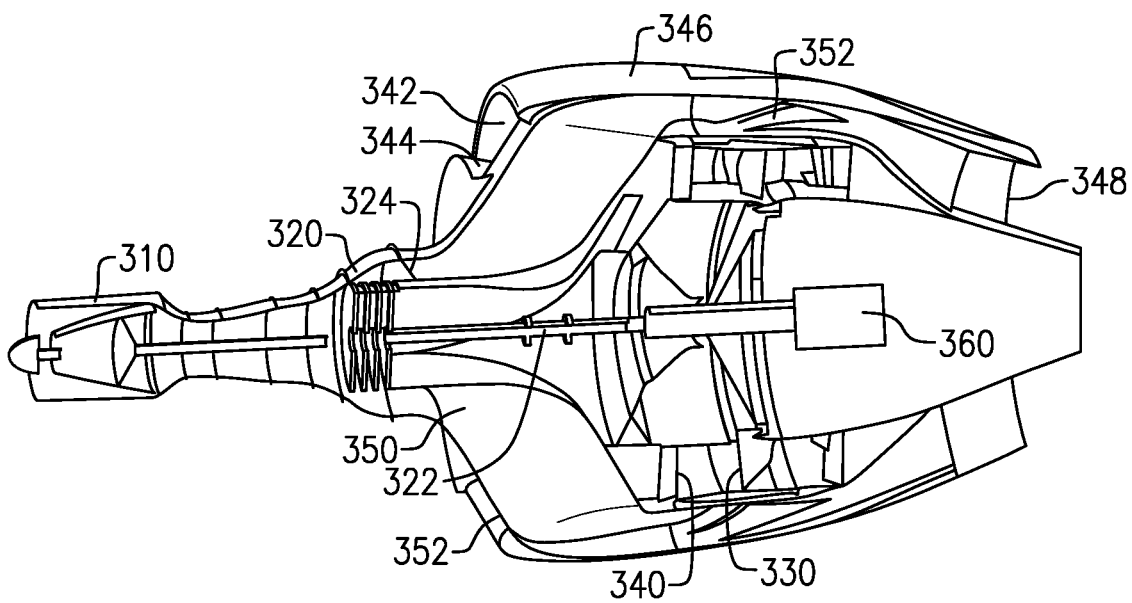
FIG. 4 schematically illustrates a cross section of the aft fan gas turbine engine of FIG. 3.

With continued reference to FIGS. 1 and 2, FIG. 3 schematically illustrates an isometric view of an example aft fan gas turbine engine 300 according to one embodiment. Similarly, FIG. 4 schematically illustrates a cross sectional view of the aft fan gas turbine engine 300 of FIG. 3, along an axis defined by a turbine motor 320. A gas generator 310 is positioned fore of the turbine motor 320, and provides pressurized gas to the turbine motor 320. The turbine motor 320 is connected to a fan 330 via a shaft 322. In the illustrated example, the gas generator 310 is a two spool gas generator. In alternative examples, alternative gas generator types may be utilized to the same effect.

A fan duct 340 includes an inlet 342, and is defined by an inner duct wall 344 and the outer fairing 346. The fan duct 340 further includes an outlet 348 that expels air aft of the fan 340. The inner duct wall 344 includes an interface flange that interfaces the aft fan engine 300 with the fuselage of the aircraft on which the aft fan engine 300 is mounted, and maintains the engine 300 in position relative to the fuselage.

Also included in the engine 300 is a turbine exhaust duct 350 that connects an exhaust outlet 324 from the turbine motor 320 to the fan duct outlet 348. The exhaust gasses from the turbine motor 320, and the air from the fan duct 340 are mixed and expelled simultaneously. The exhaust ducts 350 pass through the fan duct 340 through multiple struts 352, and proceed through the radially outward fan ducting 352 to the outlet 348.

In some examples, such as the example of FIGS. 3 and 4, an electrical generator 360 can be further connected to the shaft 322, and generate electrical energy via rotation of the shaft 322. In some examples, the electrical generator 360 is directly connected to the shaft 322. In other examples, the electrical generator 360 is connected to the shaft via a clutch, and can be geared to rotate at a different speed than the shaft 322. While illustrated herein as being positioned aft of the fan 330, one of skill in the art will appreciate that, in alternate examples, the electrical generator 360 can be positioned at any position along the shaft 322 and is not limited to being positioned aft of the fan 330.

In alternative examples, the electrical generator 360 is sized to absorb power from the fan 330, and prevent the fan 330 from windmilling during takeoff and landing, or during any other mode of operations. In such a case, electrical energy can be actively supplied to the electrical generator 360 from a power source applying rotational force opposite a direction of windmilling, or the natural resistance to rotation of the electrical generator 360 can prevent rotation of the fan 330, depending on the specific configuration of the electrical generator 360 being utilized and of the aft fan engine.

While illustrated in the examples of FIGS. 3 and 4 as being in line with the turbine motor, one of skill in the art, having the benefit of this disclosure, will appreciate that the gas generator 310 need not be in line with the turbine motor 320. In such an example, the gas generator 310 can be angled, relative to an axis defined by the turbine motor 320, and shifted radially, relative to the axis, within the fuselage of the aircraft. This angling and shifting allows an area surrounding the gas generator 310 susceptible to burst damage during a catastrophic failure of the gas generator 310 to be controlled, and prevents the area from intersecting with any vital elements of the aft fan engine 300, or any other essential operational elements of the aircraft. This area is referred to as the "burst zone".

With continued reference to FIGS. 1-4, FIG. 5 schematically illustrates a connection of an aft fan engine 400 to a tail section 450 of an aircraft. As with some current aircraft constructions, the tail section includes a vertical tail stabilizer 452, and an aft fuselage bulkhead 454 below the vertical stabilizer 452. A flange 402 of the aft fan engine 400 interfaces with the aft fuselage bulkhead 454 via any known interfacing or mounting system. The flange 402 forms the radial internal surface of a boundary layer ingestion inlet 404. Due to the position of the boundary layer ingestion inlet 404, a boundary layer immediately adjacent the surface of the fuselage 456 is ingested into the fan duct, and driven through the aft fan engine via a fan 406.

As the flange 402 based interconnection interfaces with standard tail section architecture, the aft fan engine 400 can be connected to, and operate on, existing aircraft without requiring substantial modification of the existing aircraft architecture. In doing so, the existing aircraft can recognize the benefit of an energized boundary layer through increased efficiency of the primary engines, and through decreased thrust requirements during operation.

Figure 5:
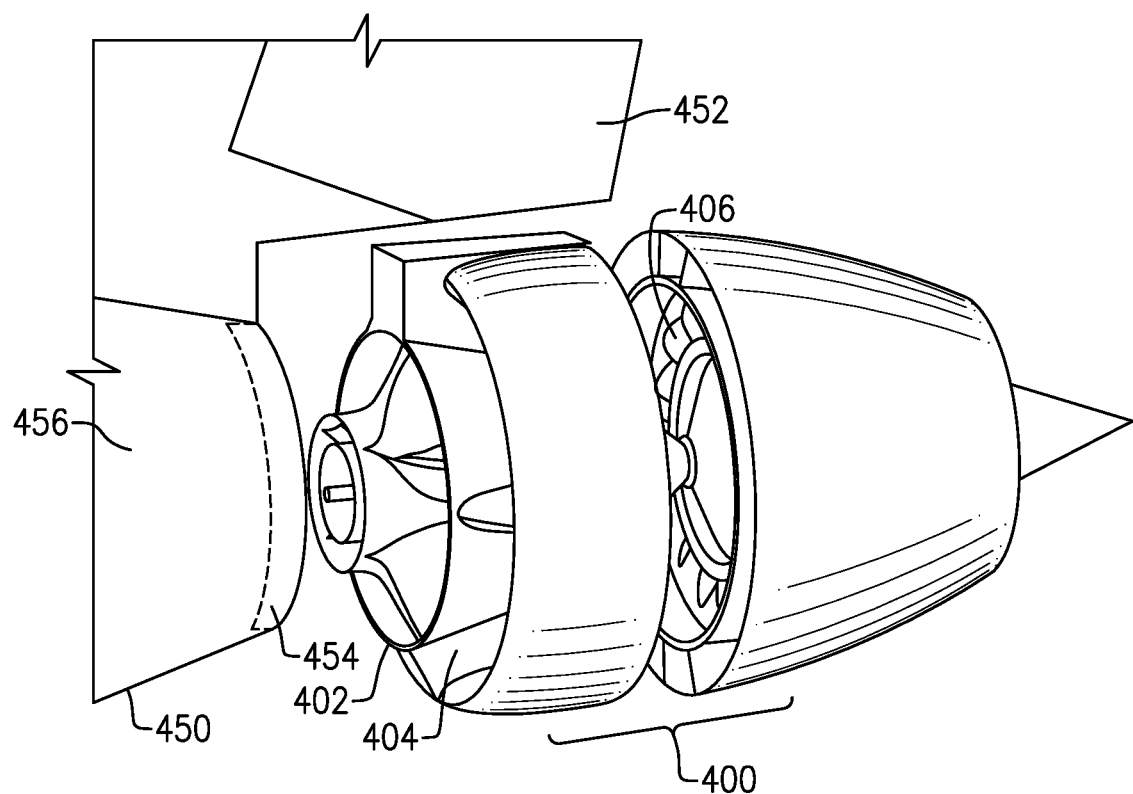
FIG. 5 schematically illustrates an isometric view of an aft fan gas turbine engine connection to an aircraft.
Figure 6:
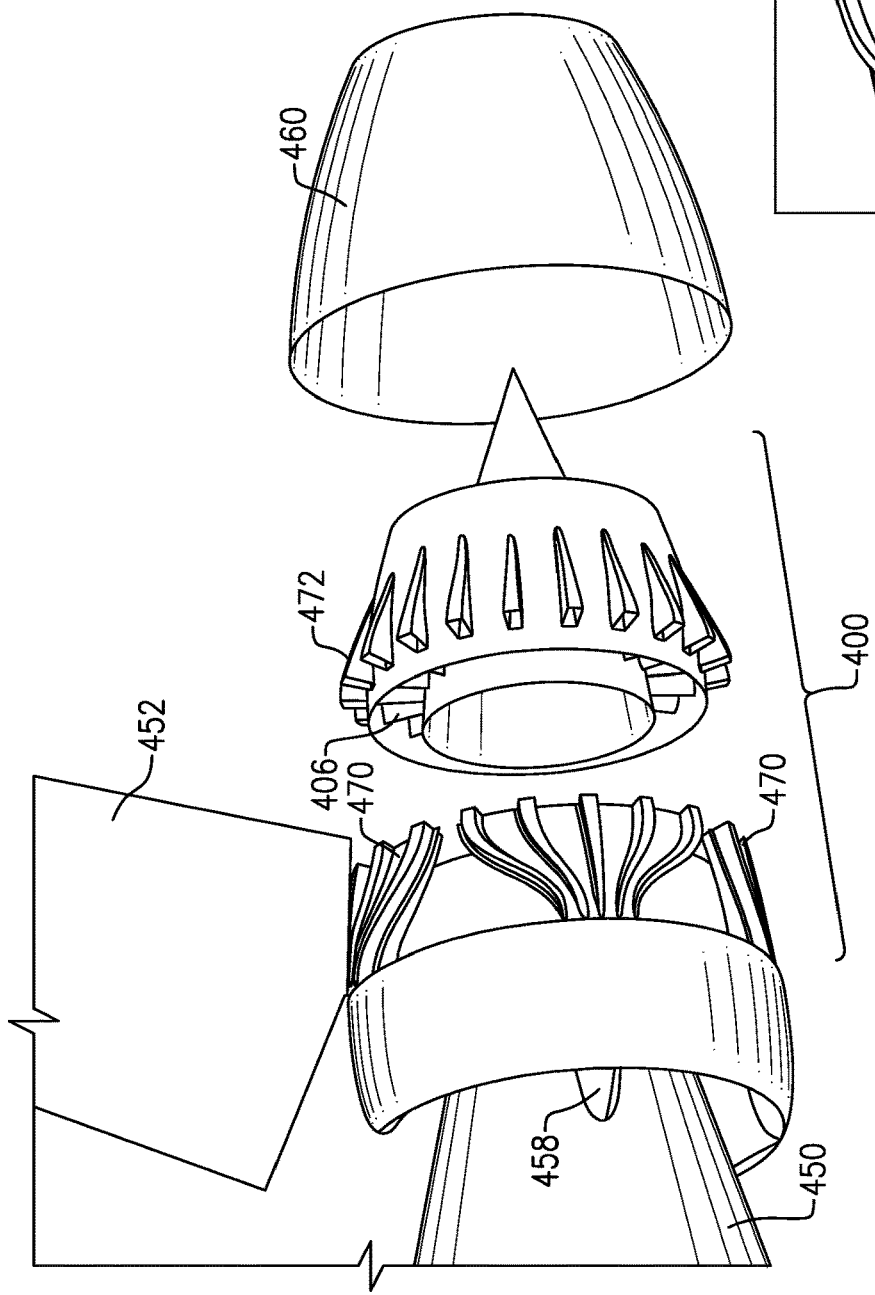
FIG. 6 schematically illustrates a partially exploded view of the aft fan gas turbine engine.

With continued reference to FIG. 5, FIG. 6 illustrates the engine 400 of FIG. 5 connected to the tail section 450, with a fairing 460 removed for illustrative purposes. Interior to the fairing 460 is a ducting system 470. The ducting system 470, protrudes through structural struts 458 is connected to an exhaust from the turbine motor 320 (See FIG. 3). Each exhaust duct in the ducting system 470 is connected to multiple exhaust mixers 472 positioned aft of the fan 406. The exhaust mixers 472 direct a portion of exhaust from the corresponding exhaust duct 470 into a fanstream aft of the fan, where the exhaust is mixed with the ingested boundary layer air, and subsequently expelled from the aft fan engine 400.

Figure 7:
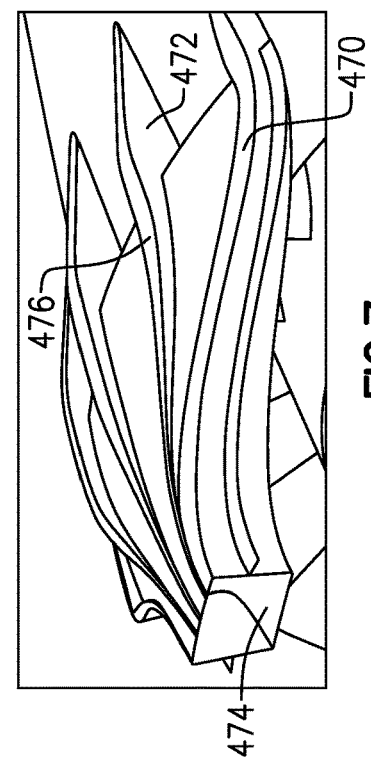
FIG. 7 schematically illustrates an exemplary exhaust duct connection for an aft fan turbine engine.

With continued reference to FIG. 6, FIG. 7 schematically illustrates the connection between the ducting 470 and the exhaust mixers 472 in a closer view. As will be appreciated by one of skill in the art, the ducting system 470 includes multiple primary ducts 474, each of which splits into multiple branches 476. Each of the branches 476 connects with a corresponding exhaust mixer 472, which injects the exhaust gasses into the primary flowpath of the aft fan engine 400. By mixing the two air streams in this manner, the turbulence resulting from the different velocities of the airstreams is reduced, as well as accompanying noise. In the illustrated example, the exhaust mixers 472 are distributed evenly about the circumference of the aft fan engine 400. In alternative examples, the spacing can be uneven, depending on the specific desired characteristics of the exhaust mixing. In yet further examples, the ducting 470 can be directed through fan exit guide vanes, or other non-structural turning vanes in the fanstream.

While illustrated and described herein with reference to an aircraft turbine engine, one of skill in the art will appreciate that the described aft fan turbine engine can be utilized in alternative environments, such as a marine environment, where fluids other than air are driven through the fan. In such an example, the boundary layer ingested by the fan is comprised of the ambient fluid of the environment.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A boundary layer ingestion engine comprising:
a gas generator;
a turbine fluidly connected to the gas generator;
a fan positioned aft of, and mechanically linked to, the turbine via a shaft such that rotation of the turbine is translated to the fan; and
a boundary layer ingestion inlet aligned with an expected boundary layer, such that said boundary layer ingestion inlet is configured to ingest fluid from a boundary layer during operation of the boundary layer ingestion engine, wherein the boundary layer inlet is an inlet of a fan duct; and
further comprising at least one turbine exhaust duct connected to an exhaust outlet of the turbine, at least a portion of the at least one turbine exhaust duct passing radially outwards of at least a portion of the fan duct, wherein said fan duct and said at least one turbine exhaust duct merge aft of said fan and fore of a flowpath outlet of the boundary layer ingestion engine.

2. The boundary layer ingestion engine of claim 1, wherein the at least one turbine exhaust ducts passes through the fan duct interior and through at least one strut.

3. The boundary layer ingestion engine of claim 1, further comprising an electric generator mechanically connected to said fan such that rotation of the fan drives rotation of the electric generator.

4. The boundary layer ingestion engine of claim 3, wherein said electric generator is mechanically connected to said fan through a clutch, and said generator is configured to rotate at a different rotational speed than said fan.

5. The boundary layer ingestion engine of claim 1, wherein the boundary layer ingestion engine is an auxiliary power unit.

6. The boundary layer ingestion engine of claim 1, wherein the boundary layer ingestion engine is a tail mounted engine for an aircraft, and wherein said aircraft includes at least two wing mounted engines.

7. The boundary layer ingestion engine of claim 6, wherein the tail mounted engine is sized to provide approximately 15% of a thrust requirement during all modes of engine operation, and the at least two wing mounted engines are sized to provide a combined 85% of the thrust requirement during all modes of engine operation.

8. The boundary layer ingestion engine of claim 1, wherein the gas generator is angled relative to an axis defined by the turbine.

9. The boundary layer ingestion engine of claim 8, wherein the angle of the gas generator defines a burst zone and wherein the burst zone is characterized by a lack of intersection with essential aircraft components.

10. The boundary layer ingestion engine of claim 1, wherein an inner wall of said boundary layer ingestion inlet is an aircraft tail connection flange.

* * * * *